J. B. BLAIN.
GREASE CUP.
APPLICATION FILED APR. 27, 1918.

1,383,379.

Patented July 5, 1921.
2 SHEETS—SHEET 1.

Witness
Eric Ischinger.

Inventor
JOHN B. BLAIN
By Frank Keiper
Attorney

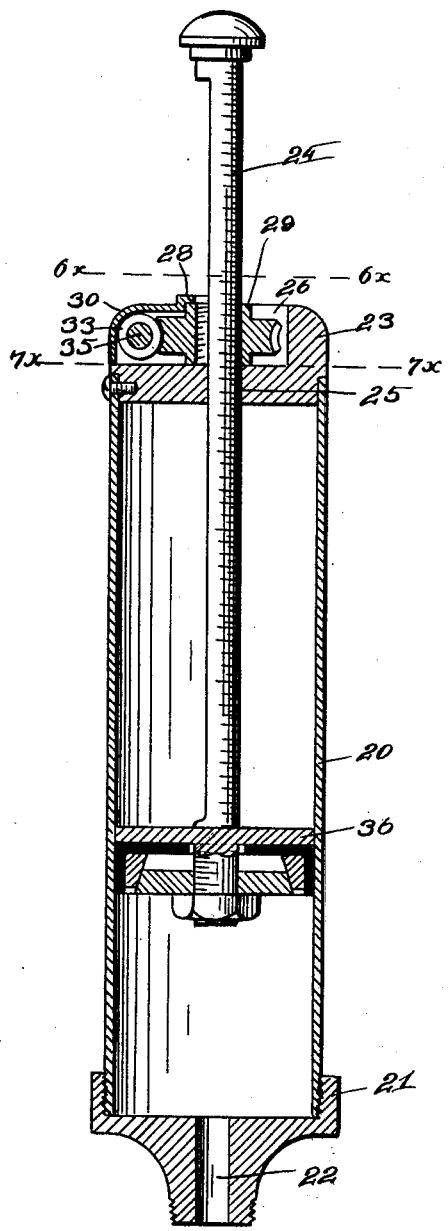
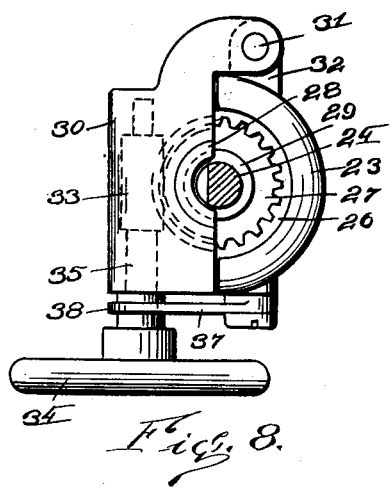
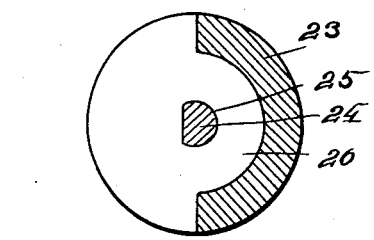
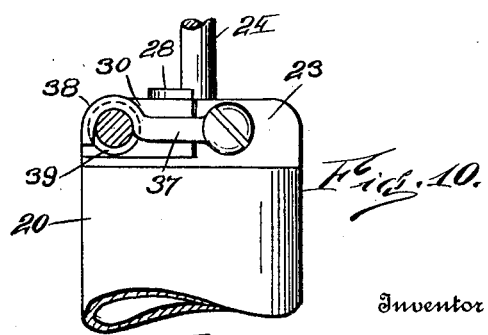

UNITED STATES PATENT OFFICE.

JOHN B. BLAIN, OF ROCHESTER, NEW YORK.

GREASE-CUP.

1,383,379.  Specification of Letters Patent.  Patented July 5, 1921.

Application filed April 27, 1918. Serial No. 231,219.

*To all whom it may concern:*

Be it known that I, JOHN B. BLAIN, a citizen of the United States, residing at Rochester, in the county of Monroe and State of New York, have invented certain new and useful Improvements in Grease-Cups, of which the following is a specification.

The object of this invention is to construct a grease cup out of which the lubricant can be forced out at a greater pressure than has heretofore been possible.

With this and other objects in view, this invention comprises a combination and arrangement of parts which will be fully illustrated in the drawings, described in the specification and pointed out in the claim at the end thereof.

In the accompanying drawings:

Fig. 7 is a vertical sectional view of a grease gun embodying the principles of the grease cup shown in Figs. 1 to 4 inclusive.

Fig. 8 is a top plan view of the grease gun shown in Fig. 5.

Fig. 9 is a horizontal section through the grease gun taken on the line 7×—7× of Fig. 5.

Fig. 10 is a side elevation of the head of the grease gun.

In the several figures of the drawings, like reference numerals indicate like parts.

In the construction of the grease cups that are in general use at the present time, the pressure with which the lubricant can be forced out is limited. This is partially due to the fact that the piston and its packing is rotated when the lubricant is forced out of the cylinder end and in doing so, allows the lubricant to leak through between the cylinder wall and the packing.

Another reason for the leaking of the ordinary grease cup is due to the fact that at every refilling of the cup, the piston and its packing must be taken out of the top of the cylinder before it can be filled, and in replacing the piston the packing must be bent forward over the piston while inserting it into the cylinder with the result that the packing is cut or scraped by the edge of the cylinder as it passes in so that it slightly wears off each time it is inserted therein.

The wear of the packing ring due to this cause as well as to the friction between it and the cylinder wall as it rotates inside of it, soon results in the leaking of the piston and as no provision is made to take up this wear, it will necessitate a new packing after it has been in use a very short time.

Figure 4:
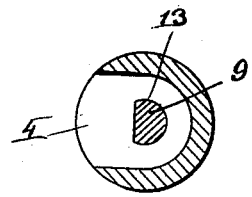
Fig. 4 is a horizontal section through the cup, the section being taken on the line 4×—4× of Fig. 3.
Figure 1:
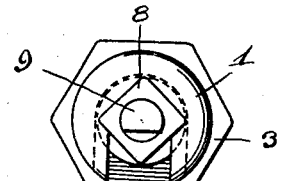
Figure 1 is a top plan view of the grease cup.
Figure 3:
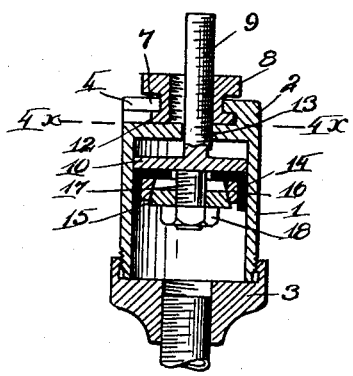
Fig. 3 is a vertical section through the cup, the section being taken on the line 3×—3× of Fig. 2.
Figure 2:
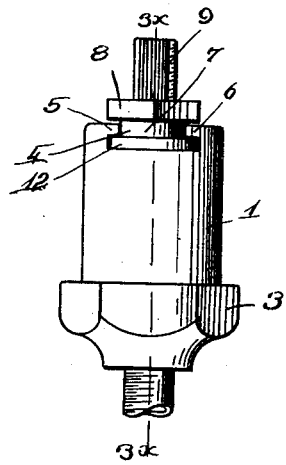
Fig. 2 is a side elevation of the grease cup.
Figure 6:
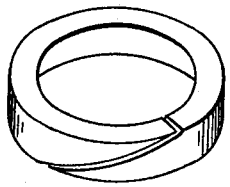
Fig. 6 is a perspective view of the washer for expanding the split ring.
Figure 5:
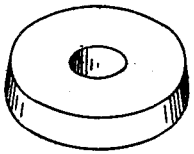
Fig. 5 is a perspective view of the split ring forming part of the piston.

To eliminate these faults, the grease cup forming this invention comprises a cylinder 1 which is closed at the top at 2 and has a bottom 3 suitably threaded thereon. The perimeter of the bottom 3 is preferably formed in the shape of a hexagon nut as shown in Figs. 1 and 2 so that the grease cup can be readily attached to a bearing by means of a suitable wrench. The top or head 2 of the cylinder 1 is formed integral with the cylinder and has a horizontal and inverted T slot 4 milled into the top at one side thereof. The overlapping flanges 5 and 6 formed by the T slot 4 project into an annular groove 7 formed in the adjusting nut 8. This adjusting nut makes threaded engagement with the threaded piston rod 9 which is adapted to pass therethrough in either direction. A piston 10 is carried on the end of the piston rod 9 on the inside of the cylinder, 1 and is drawn up or forced down therein as the piston rod is screwed through the nut 8 in either one or the other direction.

In assembling the grease cup the circular flange 12 forming one side of the annular groove 7 of the adjusting nut 8 is slid into the bottom of the T slot 4 to bring the threaded opening of the nut 8 in line with the opening 13 provided in the end 2 of the cylinder 1. The piston rod 9 is then inserted into the bottom of the cylinder 1 until it projects through the opening 13 in the end 2 of the cylinder and makes engagement with the threaded adjusting nut 8. The nut 8 is then rotated by a suitable wrench to screw the piston rod upwardly and draw the piston 10 carried on the end of the piston rod 9 into the inside of the cylinder.

As shown in Figs. 1 to 4 inclusive, one side of the threaded piston rod is partially cut away the full length thereof to form a flat surface thereon. The opening 13 provided in the end of the cylinder 2 corresponds with the outline of the perimeter of the piston rod in that it is circular in outline with a small section filled out to form a flat surface in the periphery thereof. The flat sides of both the opening 13 and the piston rod 9 will be placed adjacent to each other when the piston rod is inserted into the opening in order to prevent the piston rod 9 from turning when the adjusting nut 8 is rotated to thread the piston rod through it while drawing in or forcing out the piston 10 in the cylinder 1.

In this manner, the piston 10 during its inward or outward movement is never rotated and the piston packing 14 which is carried on the end of the piston 10 always remains in one position during its straight line movement along the cylinder wall.

The piston 10 comprises a washer formed on the end of the piston rod 9. A stud 17 extends out from the center of this washer and has a conical washer 15 adapted to slide thereon. The conical washer 15 projects into a conical split ring 16 in which it is held in place by the clamping nut 18 which is threaded on the end of the stud 17. The packing 14 is held against the under side of the washer on the end of the piston rod 9 and against the inner wall of the cylinder 1 by means of the split ring 16.

When the lubricant is forced down by the piston 10, the conical washer 15 is forced upwardly into the split ring 16 and expands it so that the packing is forced outwardly by it against the cylinder wall. The greater the pressure with which the lubricant is forced out from the cup, the greater will be the force with which the packing of the piston is forced against the cylinder wall, and the less chance the lubricant will have to leak past it.

Any wear of the packing is taken up by the clamping nut by screwing it back on the stud to force the conical washer into the split ring. This expands the ring and forces the packing outwardly to compensate for the wear on the outside thereof.

The bottom 3 of the cylinder 1 is provided with an opening which is suitably threaded to receive a coupling by means of which the grease cup can be attached to a bearing.

To fill the cup the cylinder 1 with its piston is screwed off from the bottom 3 and the piston is placed in its innermost position near the closed head of the cylinder. The lubricant can then be inserted into the cylinder which is then ready to be screwed back onto the bottom. The lubricant is forced through the opening in this bottom by the rotation of the adjusting nut 8 which forces the piston rod 9 and its piston 10 downwardly against the lubricant contained in the cylinder.

In Figs. 7 to 10 inclusive, the construction of the grease cup heretofore described is embodied in a so-called grease gun. The cylinder 20 of this grease gun is threaded at the bottom to receive the threaded bottom 21 having a suitable opening 22 provided in the center thereof through which the grease is forced out. The other end of the cylinder 20 has the head 23 fastened thereto through which the piston rod 24 is adapted to pass. An opening 25 having a flat side similar to the opening 13 in the cylinder 1 of the grease cup as shown in cross section in Fig. 7, is provided in the center of the head 23 through which the piston rod 24 is adapted to pass.

The piston rod 24 is suitably threaded along the full length thereof, and has one side thereof cut away to form a flat surface thereon which corresponds with the flat side in the opening 25 so that when the piston passes through the opening 25, it is prevented from rotating therein.

Threaded on the piston rod 24 and resting in the pocket 26 provided on the outer end of the head 23 is the worm wheel 27. This worm wheel is held in place in the pocket 26 by means of the horizontal flange 28 which is semi-circular in outline and overlaps a portion of the hub 29 of the worm wheel 27. The semi-circular flange 28 forms a part of the top of the casing 30 which is mounted to swing on a vertical pin 31 carried in the lug 32. This lug is integral with the head 23 and projects out therefrom on one side thereof.

Mounted to rotate in the casing 30 is the worm 33 which is adapted to mesh with the worm wheel 27. The worm wheel 27 is rotated by this worm which for this purpose has a hand wheel 34 keyed to the outer end of the shaft 35 on which the worm 33 is carried. On the rotation of the hand wheel 34 the worm 33 rotates the worm wheel 27 and screws the piston rod 24 up or down according to the direction in which the hand-wheel is rotated.

The casing 30 is hinged on one side of the head 32 as above described and can be swung away from the worm wheel 27 so as to disengage the worm 33 from the worm wheel and allow the piston rod 24 to lift the worm wheel out of the pocket 26 to move the piston 36 carried on the end of the piston rod 24 on the inside of the cylinder inwardly.

This is done for the purpose of quickly filling the gun with a lubricant so as to make unnecessary to revolve the hand wheel 34 until the piston has traversed the whole length of and made room in the cylinder to receive the lubricant.

The worm wheel 27 after being lifted out of the pocket 26 by the piston during its upward movement and while disengaged from the worm 33 is rotated thereon until it is brought back in place in the pocket 26.

The cylinder of the gun is then filled and the casing 30 is swung back to allow the worm to again mesh with the worm wheel and hold the worm wheel in place in the pocket through the flange 28 in order that the piston rod and its piston can be forced downwardly by the hand wheel to force the lubricant out of the cylinder. The casing 30 is held locked in place by means of the dog 37 which is pivoted on the side of the head 23. This dog has a hookshaped end 38 which engages with the annular groove 39 provided in the hub of the hand wheel 34, and prevents the casing from swinging horizontally around its pivot pin until it is disengaged therefrom.

I claim.

In a grease cup, the combination of a cylinder, a piston mounted to slide in said cylinder, a packing carried on the under side of said piston, an expansible packing ring having a conical opening and being angularly split at one side thereof mounted below said packing, a conical disk adapted to engage into the conical opening in said packing ring, a stem passing through said conical disk and means to prevent the movement of said disk on said stem away from said packing ring, said disk being adapted to be forced to slide on said stem into the conical opening in said packing ring by the grease contained in said cylinder on the compression thereof by said piston.

In testimony whereof I affix my signature in the presence of two witnesses.

JOHN B. BLAIN.

Witnesses:
 H. C. KELLY,
 ELI H. EATON.